US012152287B2

(12) United States Patent
Rohde et al.

(10) Patent No.: US 12,152,287 B2
(45) Date of Patent: Nov. 26, 2024

(54) PROCESS FOR THE RECOVERY OF LITHIUM AND TRANSITION METAL USING HEAT

(71) Applicant: BASF SE, Ludwigshafen am Rhein (DE)

(72) Inventors: Wolfgang Rohde, Ludwigshafen am Rhein (DE); Torben Adermann, Ludwigshafen am Rhein (DE); Thomas Michael Ryll, Ludwigshafen am Rhein (DE); Kerstin Schierle-Arndt, Ludwigshafen am Rhein (DE); Fabian Seeler, Ludwigshafen am Rhein (DE); Sabine Weiguny, Ludwigshafen am Rhein (DE); Michael Zeilinger, Ludwigshafen am Rhein (DE)

(73) Assignee: BASF SE, Ludwigshafen Am Rhein (DE)

( * ) Notice: Subject to any disclaimer, the term of this patent is extended or adjusted under 35 U.S.C. 154(b) by 781 days.

(21) Appl. No.: 17/046,766

(22) PCT Filed: Apr. 1, 2019

(86) PCT No.: PCT/EP2019/058141
§ 371 (c)(1),
(2) Date: Oct. 9, 2020

(87) PCT Pub. No.: WO2019/197192
PCT Pub. Date: Oct. 17, 2019

(65) Prior Publication Data
US 2021/0147960 A1 May 20, 2021

(30) Foreign Application Priority Data
Apr. 11, 2018 (EP) .................... 18166709

(51) Int. Cl.
*C22B 26/12* (2006.01)
*C22B 1/00* (2006.01)
*C22B 3/44* (2006.01)
*C22B 7/00* (2006.01)

(52) U.S. Cl.
CPC ............. *C22B 26/12* (2013.01); *C22B 1/005* (2013.01); *C22B 3/44* (2013.01); *C22B 7/007* (2013.01)

(58) Field of Classification Search
CPC ........... C22B 26/12; C22B 1/005; C22B 3/44; C22B 7/007
See application file for complete search history.

(56) References Cited

U.S. PATENT DOCUMENTS

| | | | |
|---|---|---|---|
| 9,359,659 B2 | 6/2016 | Fujita et al. | |
| 10,865,462 B2 | 12/2020 | Ito et al. | |
| 2013/0287621 A1 | 10/2013 | Fujita et al. | |

FOREIGN PATENT DOCUMENTS

| | | | | |
|---|---|---|---|---|
| CN | 103168107 A | 6/2013 | | |
| CN | 105907989 B | * 11/2017 | ............ | C22B 23/00 |
| CN | 107653378 A | 2/2018 | | |
| CN | 106129511 A | 12/2018 | | |
| JP | 1995-245126 A | * 9/1995 | | |
| JP | 2011094228 A | * 5/2011 | | |
| JP | 2014055312 A | * 3/2014 | ............... | B09B 3/00 |
| JP | 2015-203131 A | 11/2015 | | |
| JP | 2017-115179 A | 6/2017 | | |
| RU | 2470878 C2 | 12/2012 | | |
| RU | 2639416 C2 | 12/2017 | | |
| RU | 2648807 C2 | 3/2018 | | |
| WO | 2010-056322 A1 | 5/2010 | | |
| WO | WO-2012050317 A2 | 4/2012 | | |
| WO | 2012/090654 | 7/2012 | | |
| WO | 2014-056609 A1 | 4/2014 | | |
| WO | 2014-056610 A1 | 4/2014 | | |
| WO | 2017/159745 A1 | 9/2017 | | |

OTHER PUBLICATIONS

Xiong et al., Minerals Engineering, (2018), v. 119, p. 49-56, published Feb. 4, 2018.*
And Rothermel et al., Chem. Sus. Chem., (2016), v.9, p. 3473-3484.*
International Search Report for PCT/EP2019/058141 mailed Jun. 4, 2019.
Written Opinion of the International Searching Authority for PCT/EP2019/058141 mailed Jun. 4, 2019.
European Search Report for EP Patent Application No. 18166709.8, Issued Jul. 3, 2018, 3 pages.
International Preliminary Report on Patentability received for PCT Application No. PCT/EP2019/058141, mailed on Oct. 22, 2020, 8 pages.
Li, et al., "Recovery of cobalt and lithium from spent lithium ion batteries using organic citric acid as leachant", Journal of Hazardous Materials, vol. 176, Issue 1-3, Apr. 15, 2010, pp. 288-293.
Search Report issued by the Russian Patent Office for Russian Patent Application No. 2020136836 on Sep. 1, 2022.
Office Action issued by the Chinese Patent Office for Chinese Patent Application No. 201980024664.2 on Mar. 15, 2022.
First Examination Report issued by the Indian Patent Office for Indian Patent Application No. 202027045088 on Jul. 18, 2022.

* cited by examiner

*Primary Examiner* — Yong L Chu
(74) *Attorney, Agent, or Firm* — Armstrong Teasdale LLP

(57) ABSTRACT

Process for the recovery of transition metal from spent lithium ion batteries containing nickel, wherein said process comprises the steps of (a) heating a lithium containing transition metal oxide material to a temperature in the range of from 400 to 1200° C., (b) treating said heat-treated material with water, (c) treating the solid residue from step (b) with an acid selected from sulfuric acid, hydrochloric acid, nitric acid, methanesulfonic acid, oxalic acid and citric acid, (d) adjusting the pH value to 2.5 to 8, (e) removing compounds of Al, Cu, Fe, Zn or combinations of at least two of the foregoing from the solution or slurry obtained in step (d).

11 Claims, No Drawings

PROCESS FOR THE RECOVERY OF LITHIUM AND TRANSITION METAL USING HEAT

CROSS-REFERENCE TO RELATED APPLICATIONS

This application is a national stage application (under 35 U.S.C. § 371) of PCT/EP2019/058141, filed Apr. 1, 2019, which claims benefit of European Application No. 18166709.8, filed Apr. 11, 2018, both of which are incorporated herein by reference in their entirety.

The present invention is directed towards a process for the recovery of transition metal from spent lithium ion batteries containing nickel, said process comprising the steps of
(a) Heating a lithium containing transition metal oxide material to a temperature in the range of from 400 to 1200° C.,
(b) treating said heat-treated material with water,
(c) treating the solid residue from step (b) with an acid selected from sulfuric acid, hydrochloric acid, nitric acid, methanesulfonic acid, oxalic acid and citric acid,
(d) adjusting the pH value to 2.5 to 8,
(e) removing compounds of Al, Cu, Fe, Zn or combinations of at least two of the foregoing from the solution or slurry obtained in step (d).

Storing electrical energy is a subject of growing interest. Efficient storage of electric energy would allow electric energy to be generated when it is advantageous and used when and where needed. Secondary electrochemical cells are well suited for this purpose due to their rechargeability. Secondary lithium batteries are of special interest for energy storage since they provide high energy density due to the small atomic weight and the large ionization energy of lithium, and they have become widely used as a power source for many portable electronics such as cellular phones, laptop computers, mini-cameras, etc. but also for electric vehicles. Especially the growing demand for raw materials such as cobalt and nickel will cause challenges in future time.

Lifetime of lithium ion batteries is not unlimited. It is to be expected, therefore, that a growing number of spent lithium ion batteries will emerge. Since they contain important transition metals such as, but not limited to cobalt and nickel, and, in addition, lithium, spent lithium ion batteries may form a valuable source of raw materials for a new generation of lithium ion batteries. For that reason, increased research work has been performed with the goal of recycling transition metals—and, optionally, even lithium—from used lithium ion batteries.

Lithium ion batteries or parts of lithium ion batteries that do not meet the specifications and requirements, so-called off-spec materials and production waste, may as well be a source of raw materials.

Two main processes have been subject to raw material recovery. One main process is based upon smelting of the corresponding battery scrap followed by hydrometallurgical processing of the metallic alloy (matte) obtained from the smelting process. The other main process is the direct hydrometallurgical processing of battery scrap materials. Such hydrometallurgical processes will furnish transition metals as aqueous solutions or in precipitated form, for example as hydroxides, separately or already in the desired stoichiometries for making a new cathode active material. In the latter case the composition of metal salt solutions may be adjusted to the desired stoichiometries by addition of single metal components.

It was therefore an objective of the present invention to provide a process that allows the easy recovery of nickel and if present cobalt and manganese. It was another objective of the present invention to provide a method for the recovery of further valuable elements contained in battery scraps namely lithium, fluorine and carbon as graphite. It was a particular objective of the present invention to provide a process that allows the efficient recovery of nickel, optionally, cobalt and manganese, as well as lithium. It was a further objective of the present invention to provide a process for the recovery of said transition metals and lithium in high purity especially with low contents of copper and noble metals like Ag, Au and platinum group metals.

Accordingly, the process as defined at the outset has been found, hereinafter also referred to as inventive process or as inventive recycling process. The inventive process comprises steps defined in more detail below, hereinafter also referred to as step (a), step (b), step (c) etc.:
(a) Heating a lithium containing transition metal oxide material to a temperature in the range of from 400 to 1200° C.,
(b) treating said heat-treated material with water,
(c) treating the solid residue obtained in step (b) with an acid selected from sulfuric acid, hydrochloric acid, nitric acid, methanesulfonic acid, oxalic acid and citric acid,
(d) adjusting the pH value to 2.5 to 8,
(e) removing compounds of Al, Cu, Fe, Zn or a combination of at least two of the foregoing from the slurry obtained in step (d), and, optionally,
(f) precipitating nickel and cobalt as mixed hydroxide, oxyhydroxide or carbonate or metal.

Steps (a) to (e) and, if applicable, step (f), are carried out in the above order.

Step (a)

Step (a) includes heating a lithium containing transition metal oxide material such cathode material to a temperature in the range of from 400 to 1200° C., preferably 600 to 900° C., more preferably 700 to 850° C. In another form the heating in step (a) is to a temperature from 500 to 900° C., preferably from 600 to 850° C. The heating in step (a) can be done in externally heated ovens (e.g. electrically heated ovens) or in ovens with internal burners (e.g. rotary kilns). The heating in step (a) can be done under a pressure from 0.001 bar to 100 bar, preferably under ambient pressure or below (e.g. in vacuum ovens).

In one embodiment of the present invention, step (a) has a duration in the range of from 20 minutes to 8 hours, preferably 30 min to 4 hours, more preferably 45 min to 2 hours.

Said lithium containing transition metal oxide material is a material that stems from lithium ion batteries or parts of lithium ion batteries. For safety reasons, such lithium ion batteries are discharged completely, otherwise, shortcuts may occur that constitute fire and explosion hazards. Such lithium ion batteries may be disassembled, punched, milled, for example in a hammer mill, or shredded, for example in an industrial shredder.

Preferably, the lithium containing transition metal oxide material is present in form of complete batteries, battery modules, battery cells, or battery scraps.

In one form the lithium containing transition metal oxide material is present in form of complete batteries, battery modules or battery cells. In this case the heating in step (a) is preferably performed in a rotary kiln. After the heating in step (a) of the complete batteries, battery modules or battery cells the resulting material may be further comminuted (e.g.

by shredders or hammermills) and separated in different fractions containing mainly ferrous and non-ferrous metals and fractions containing particulate matter comprising materials from the electrodes like graphite and lithium and transition metal containing particles. The separation of magnetizable components may be achieved by magnetic separation, conducting metal parts may be separated by eddy current separators, and insulating components by electrosorting. Sensor based sorting techniques may also be employed. Particulate matter may be separated by sieving or classifying.

It is advantageous to at least partially remove electrolytes before starting step (a), especially electrolytes that comprise an organic solvent or a mixture of organic solvents, for example by mechanic removal or drying, for example at temperatures in the range of from 50 to 250° C. under atmospheric pressure or below.

In one embodiment of the present invention, said lithium containing transition metal oxide material is from battery scraps. In a preferred embodiment of the present invention, said lithium containing transition metal oxide material is from mechanically treated battery scraps, for example from battery scraps treated in a hammer mill or in an industrial shredder. Such lithium containing transition metal oxide material may have an average particle diameter (D50) in the range of from 1 μm to 1 cm.

In one embodiment of the present invention, the mechanically treated battery scrap is subjected to a solvent treatment in order to dissolve and separate polymeric binders used to bind the lithium transition metal oxides to the current collector films. Suitable solvents are N-methyl-pyrrolidone, N,N-dimethylformamide, N,N-dimethylacetamide, and N-ethylpyrrolidone, dimethylsulfoxide, hexamethyl phoshoramide, tetramethylurea, trimethylphosphate and triethylphosphate in their pure form, or mixtures of at least two of the foregoing.

Said lithium containing transition metal oxide material may have a regular shape but usually it has irregular shape. It is preferred, though, to remove a light fraction such as housing parts from organic plastics and aluminum foil or copper foil as far as possible, for example in a forced stream of gas.

In one embodiment of the present invention, said lithium containing transition metal oxide material does not contain a major amount of impurities such as, but not limited to, other parts or materials from parts of a lithium ion battery. Such lithium containing transition metal oxide material may include off-spec material from the production of batteries, battery modules or battery cells or battery cell components like the cathode or the cathode active material.

However, said lithium containing transition metal oxide material contains in the range of from 0.1 to 95% by weight, preferably 0.1 to 80% by weight of compounds other than nickel compounds such as nickel/cobalt compounds or nickel/cobalt/aluminum compounds or nickel/cobalt/manganese compounds, if applicable, and in extreme cases the valuable material is a minority component. Examples of such other components are carbon in electrically conductive form, hereinafter also referred to as conductive carbon, for example graphite, soot, and graphene. Further examples of impurities are copper and its compounds, aluminum and compounds of aluminum, for example alumina, iron e.g. as steel and iron compounds, zinc and zinc compounds, silicon and silicon compounds, for example silica and oxidized silicon $SiO_y$ with zero$<y\leq 2$, tin, silicon-tin alloys, and organic polymers such as polyethylene, polypropylene, and fluorinated polymers, for example polyvinylidene fluoride, and the like. Further examples of impurities are fluoride and compounds of phosphorous that may stem from liquid electrolytes, for example in the widely employed $LiPF_6$ and products stemming from the hydrolysis of $LiPF_6$. Battery scraps that serve as starting material for the inventive process may stem from multiple sources, and therefore said lithium containing transition metal oxide material in most of the embodiments contains compounds other than nickel/cobalt compounds or nickel/cobalt/manganese compounds or nickel/cobalt/aluminum compounds, if applicable, one of such components being carbon in electrically conductive form in the range of from 1 to 65% by weight, referring to entire lithium containing transition metal oxide material.

In embodiments in which said lithium containing transition metal oxide material entirely or almost entirely stems from off-spec material it is advantageous to add carbon e.g. as coal, charcoal, lignite, graphite or soot or even polymer particles e.g. from polymer wastes prior to step (a).

In a preferred embodiment of the present invention, said lithium containing transition metal oxide material contains in the range of from 20 ppm to 3% by weight of copper, as metal or in form of one or more of its compounds.

In a preferred embodiment of the present invention, said lithium containing transition metal oxide material contains in the range of from 100 ppm to 30% by weight of aluminum, as metal or in form of one or more of its compounds.

In a preferred embodiment of the present invention, said lithium containing transition metal oxide material contains in the range of from 100 ppm to 30% by weight of iron, as metal or alloy or in form of one or more of its compounds.

In a preferred embodiment of the present invention, said lithium containing transition metal oxide material contains in the range of from 20 ppm to 5% by weight of zinc, as metal or alloy or in form of one or more of its compounds.

In a preferred embodiment of the present invention, said lithium containing transition metal oxide material contains in the range of from 20 ppm to 2% by weight of zirconium, as metal or alloy or in form of one or more of its compounds.

In a preferred embodiment of the present invention, said lithium containing transition metal oxide material contains in the range of from 20 ppm to 2% by weight of tungsten, as metal or alloy or in form of one or more of its compounds.

In a preferred embodiment of the present invention, said lithium containing transition metal oxide material contains in the range of from 2% to 8% by weight of fluorine, calculated as a sum of organic fluoride bound in polymers and inorganic fluoride in one or more of its inorganic fluorides.

In a preferred embodiment of the present invention, said lithium containing transition metal oxide material contains in the range of from 0.2% to 2% by weight of phosphorus. Phosphorus may occur in one or more inorganic compounds.

In a preferred embodiment of the present invention, said lithium containing transition metal oxide material contains in the range of from 20 ppm to 10% by weight of silicon, in elemental form or in form of one or more of its compounds.

Said lithium containing transition metal oxide material contains nickel and cobalt. Examples of lithium containing transition metal oxide materials may be based on lithiated nickel cobalt manganese oxide ("NCM") or on lithiated nickel cobalt aluminum oxide ("NCA") or mixtures thereof.

Examples of layered nickel-cobalt-manganese oxides are compounds of the general formula $Li_{1+x}(Ni_aCo_bMn_cM^1_d)_{1-x}O_2$, with $M^1$ being selected from Mg, Ca, Ba, Al, Ti, Zr, Zn, Mo, V, W and Fe, the further variables being defined as follows: zero≤x≤0.2, 0.1≤a≤0.8, Zero≤b≤0.5, preferably 0.05<b≤0.5, zero≤c≤0.6, zero≤d≤0.1, and a+b+c+d=1.

In a preferred embodiment, in compounds according to general formula (I)

$$Li_{(1+x)}[Ni_aCo_bMn_cM^1_d]_{(1-x)}O_2 \quad (I)$$

$M^1$ is selected from Ca, Mg, Zr, Al and Ba, and the further variables are defined as above.

Examples of lithiated nickel-cobalt aluminum oxides are compounds of the general formula $Li[Ni_hCo_iAl_j]O_{2+r}$. Typical values for r, h, i and j are: h is in the range of from 0.8 to 0.90, i is in the range of from 0.15 to 0.19, j is in the range of from 0.01 to 0.05, and r is in the range of from zero to 0.4. Particularly preferred are $Li_{(1+x)}[Ni_{0.33}Co_{0.33}Mn_{0.33}]_{(1-x)}O_2$, $Li_{(1+x)}[Ni_{0.5}Co_{0.2}Mn_{0.3}]_{(1-x)}O_2$, $Li_{(1+x)}[Ni_{0.6}Co_{0.2}Mn_{0.2}]_{(1-x)}O_2$, $Li_{(1+x)}[Ni_{0.7}Co_{0.2}Mn_{0.3}]_{(1-x)}O_2$, $Li_{(1+x)}[Ni_{0.8}Co_{0.1}Mn_{0.1}]_{(1-x)}O_2$ each with x as defined above, and $Li[Ni_{0.85}Co_{0.18}Al_{0.02}]O_2$.

Step (a) may be performed under any atmosphere. In one embodiment of the present invention, however, step (a) is performed under an inert atmosphere, for example nitrogen or rare gas. In one embodiment of the present invention, step (a) is performed under an atmosphere that contains some oxygen, for example 2 to 10% by volume. In another embodiment of the present invention, step (a) is performed under air.

In another embodiment of the present invention the composition of the atmosphere is changed during step (a) this may be done for example in the case that volatile organic compounds are present in the feed that will be stripped off at an inert atmosphere before switching the atmosphere to an oxygen containing atmosphere. In a preferred form the atmosphere is changed during step (a) from inert to oxygen containing atmosphere. In a preferred form step (a) is performed under inert atmosphere, under an atmosphere that contains oxygen, or the atmosphere is changed during step (a) from inert to oxygen containing atmosphere.

In one embodiment of the present invention, step (a) is performed in the presence of steam, for example under an inert atmosphere that contains water in the gas state or air that contains water in the gas state.

In one embodiment of the present invention, step (a) is performed in the presence of lime, quartz or silicate(s), lime being preferred. Lime may be selected from slaked lime and quicklime or burnt lime. In a preferred embodiment of the present invention, step (a) is performed in the presence of 2 to 40% by weight of lime or quartz or silicate, referring to lithium containing transition metal oxide material.

After having performed step (a) the heat-treated said lithium containing transition metal oxide material is cooled down, for example to room temperature or somewhat above room temperature, for example 25 to 90° C. This cooling can be done by transferring the heated material from the oven to a cold atmosphere. A more efficient cooling may be achieved by spraying water on the hot material or by suspending the hot material in water. In the latter case the aqueous phase obtained from cooling the hot material may be introduced in step (b).

In one embodiment of the present invention, prior to step (b) a step (a1) is performed, said step (a1) comprising the removal of e.g. carbon or organic polymers by a dry solid-solid separation method. Examples of such dry solid-solid separation methods are electro-sorting, sieving or other classification, eddy-current separation, magnetic separation methods and any combination of at least two of these methods. Preferred are classification and magnetic separation and a combination of both.

Step (b)

Step (b) of the inventive process includes treating said heat-treated material (e.g. the material obtained in step (a) or (a1)) with water, preferably with water under $CO_2$ at a pressure in the range of from 10 to 150 bar, preferably 15 to 100 bar.

The water used in step (b) may be tap water or deionized water, where the latter is preferred. The water used in step (b) may comprise a weak acid (e.g. carbonic acid, formic acid, acetic acid or sulfurous acid) or a strong acid (e.g. sulfuric acid, hydrochloric acid, nitric acid). The water may comprise the weak acid in a concentration of 0.1 to 10 wt %, preferably 1 to 10 wt %. The water comprise strong acids in a low concentration adjusted to pH 5 to 6.5. Preferably, the water comprises carbonic acid, which is preferably obtained by applying a carbon dioxide atmosphere, e.g. at a pressure of in the range of from 10 to 150 bar, preferably 15 to 100 bar. In one embodiment the diluted acid is dosed in a controlled way such that the pH-value of the solution is kept above pH 4 and below pH 7.

In one embodiment of the present invention, step (b) is performed at a temperature in the range of from 5 to 200° C., or 5 to 100° C., or 5 to 50° C., preferably 15 to 35° C. In cases of temperatures above the boiling point of the water step (b) can be performed under pressure.

In one embodiment of the present invention, step (b) has a duration in the range of from 20 minutes to 10 hours, preferably 1 to 3 hours.

In one embodiment of the present invention, the ratio of water to material obtained in step (a) is in the range of from 1:2 to 100:1, preferably 1:1 to 10:1 by weight.

The slurry of step (b) may be stirred, agitated, or subjected to a grinding treatment, for example in a ball mill or stirred ball mill. Such grinding treatment often leads to a better access of the aqueous medium to the particulate material. In one embodiment the mixture in step (b) is stirred at powers of at least 0.1 W/l or cycled by pumping in order to achieve a good mixing and to avoid settling of insoluble components or both cycled and stirred.

In one embodiment the leaching can be performed in fixed bed reactors or a series of fixed bed reactors.

At the end of step (b), the pressure may be released if applicable.

The slurry obtained in step (b) is preferably subjected to a solid-liquid separation. This can be a filtration or centrifugation or a kind of sedimentation and decantation. The solid residue may be washed with water. In order to recover such solid material fine particles, for example with an average diameter of 50 µm or less, flocculants may be added, for example polyacrylates.

By solid-liquid separation an aqueous solution containing, $LiHCO_3$ and/or $Li_2CO_3$ or the Li-salts of the respective acids employed in step (b) can be obtained. From this solution $Li_2CO_3$ or other Li-salts with low solubility in water may be precipitated directly or after a concentration by water evaporation. In the case of $LiHCO_3$ this can be precipitated as the less soluble $Li_2CO_3$ by heating. Aqueous solutions of lithium salts of organic acids or lithium nitrate may be evaporated to dryness and calcined at temperatures above 250° C. to obtain lithium carbonate or lithium oxide. From the off-gases organic compounds may be recovered or nitrogen oxides which may be recycled as nitric acid.

The solid residue remaining from step (b) may be recovered by a solid-liquid separation step. This can be a filtration or centrifugation or a kind of sedimentation and decantation. In order to recover such solid material fine particles, for example with an average diameter of 50 µm or less, flocculants may be added, for example polyacrylates.

The solid residue recovered by solid-liquid separation step, in the context of the present invention also referred to as residue from step (b), is then treated according to step (c).

In one embodiment of the present invention an aqueous slurry obtained prior to step (c) is subjected to a solid-solid separation step (c1). A solid-solid separation step serves to separate non-soluble components like carbon and polymers from the metallic or metal oxide components. Such a solid-solid separation step may be performed by mechanical, column or pneumatic, or hybrid flotations, or by magnetic separation or by gravity separation techniques. In many embodiments, collector compounds are added to the slurry which render the target components hydrophobic. Typical collector compounds for carbon and polymer particles are hydrocarbons or fatty alcohols which are introduced in amounts of 1 g to 50 kg/t of lithium containing transition metal oxide material. It is also possible to perform the flotation in an inverse sense i.e. trans-forming the originally hydrophilic components into strongly hydrophobic components by special collector substances, e.g., fatty alcohol sulfates or esterquats. Preferred is the direct flotation employing hydrocarbon collectors. In order to improve the selectivity of the flotation towards carbon and polymer particles suppressing agents can be added that reduce the amounts of entrained metallic and metal oxide components in the froth phase. Agents that can be used may be acids or bases for controlling the pH value in a range of from 3 to 9. It may also be ionic components that adsorb on the metallic or metal oxide surface or bipolar components like, for example, amino acids in their betainic form. In order to increase the efficiency of the flotation it may be advantageous to add carrier particles that form agglomerates with the hydrophobic target particles, e.g., polymer particles, carbonaceous particles, for example graphite or coal. By using magnetic carrier particles magnetic agglomerates may be formed that can be separated magnetically. In the case that the target components are paramagnetic, ferri- or ferromagnetic it is also possible to separate these components by a magnetic separation employing WHIMS, MIMS or LIMS magnetic separators.

Step (c)

In step (c), said heat treated lithium containing transition metal oxide material obtained from step (b) is treated with an acid selected from sulfuric acid, hydrochloric acid, nitric acid, methanesulfonic acid, oxalic acid and citric acid or a combination of at least two of the foregoing, for example a combination of nitric acid and hydrochloric acid.

In the case of aqueous solutions of acids the concentration of acid may be varied in a wide range, for example of 0.1 to 99% by weight preferably in a range between 10 and 96%. Preferably, said aqueous acid has a pH value in the range of from −1.5 to 2. The amount of acid is adjusted to maintain an excess of acid. Preferably, at the end of step (c) the pH value of the resulting solution is in the range of from −0.5 to 2. Preferred example of aqueous acids is aqueous sulfuric acid, for example with a concentration in the range of from 10 to 98% by weight.

The treatment in accordance with step (c) may be performed at a temperature in the range of from 20 to 200° C., preferably 20 to 130° C. If temperatures above 100° C. are desired, step (c) is carried out at a pressure above 1 bar. Otherwise, normal pressure is preferred. In the context of the present invention, normal pressure means 1 atm or 1013 mbar.

In one embodiment of the present invention, step (c) is carried out in a vessel that is protected against strong acids, for example molybdenum and copper rich steel alloys, nickel-based alloys, duplex stainless steel or glass-lined or enamel coated or titanium plated steel. Further examples are polymer liners and polymer vessels from acid-resistant polymers, for example polyethylene such as HDPE and UHMPE, fluorinated PE, PFA, PTFE, PVDF and FEP (fluorinated ethylene-propylene copolymer).

In one form the slurry obtained in step (c) may be stirred, agitated, or subjected to a grinding treatment, for example in a ball mill or stirred ball mill. Such grinding treatment leads to a better access of water or acid to the particulate material.

For example, the reaction mixture in step (c) is stirred at powers of at least 0.1 W/l or cycled by pumping in order to achieve a good mixing and to avoid settling of insoluble components. Shearing can be further improved by employing baffles. All these shearing devices need to be applied sufficiently corrosion resistant and may be produced from similar materials and coatings as described for the vessel itself.

In one embodiment of the present invention, step (c) has a duration in the range of from 10 minutes to 10 hours, preferably 1 to 3 hours.

Step (c) may be performed under an atmosphere of air or under air diluted with $N_2$. It is preferred, though, to perform step (c) under inert atmosphere, for example nitrogen or a rare gas such as Ar.

The treatment in accordance with step (c) leads at least to a partial dissolution of the metals or metal compounds that stem from the cathode active material, for example of said NCM or NCA including impurities other than carbon and organic polymers. In most embodiments, a slurry is obtained after carrying out step (c). Residual lithium and transition metals such as, but not limited to nickel and, if applicable, cobalt and manganese, are in solution.

In one embodiment of the present invention, step (c) is performed in the presence of a reducing agent. Examples of reducing agents are organic reducing agents such as methanol, ethanol, sugars, ascorbic acid, urea, bio-based materials containing starch or cellulose, and inorganic reducing agents such as hydrazine and its salts such as the sulfate, and hydrogen peroxide. Preferred reducing agents for step (c) are those that do not leave impurities based upon metals other than nickel, cobalt, or manganese. Preferred examples of reducing agents in step (c) are methanol and hydrogen peroxide. With the help of reducing agents, it is possible to, for example, reduce residual $Co^{3+}$ to $Co^{2+}$ or $Mn(+IV)$ or $Mn^{3+}$ to $Mn^{2+}$.

In a preferred embodiment of the present invention, an excess of reducing agent is employed, referring to the amount of Co and—if applicable—Mn. Such excess is advantageous in case that Mn is present. In a preferred embodiment of the present invention, an excess of reducing agent is employed, referring to the amount of residual $Co^{3+}$.

In embodiments wherein a so-called oxidizing acid has been used in step (c) it is preferred to add reducing agent in order to remove non-used oxidant. Examples of oxidizing acids are nitric acid and combinations of nitric acid with hydrochloric acid. In the context of the present invention, hydrochloric acid, sulfuric acid and methanesulfonic acid are preferred examples of non-oxidizing acids.

In one form step (c) is performed in the presence of an oxidizing agent, such as the acid itself (e.g. the oxidizing acid like nitric acid) or oxygen (e.g. air). Oxygen (e.g. air) may be applied at elevated pressures in a range between 2 to 250 bar, preferably 10 to 150 bar total pressure.

The reducing agents and oxidizing agents are usually employed in separate process steps. Often it will be sufficient to use either the one or the other. In special cases the use of both in separate steps may be advantageous, for example when the solid material obtained in the preceding steps (a) and (b) contains oxidic and metallic components that both need to be dissolved. In such cases the metals will be dissolved under oxidic conditions while the oxides may require reducing conditions.

Depending on the concentration of the aqueous acid used, the liquid phase obtained in step (c) may have a transition metal concentration in the range of from 1 up to 15% by weight, preferably 6 to 11% by weight. The transition metal concentration depends on the solubility of the corresponding salts of the acid employed. Preferably, step (c) is performed such that the transition metal concentrations of the main metals such as Ni and, optionally, Co and Mn are slightly below the solubility limit of the least soluble salt in order to ensure a high metal concentration in the solution.

Step (d)

An optional step (d1) that may be carried out after step (c) is removal of solids, for example carbonaceous materials and of polymers and of insoluble metals and metal compounds. Said step (d1) may be carried out by filtration centrifugation or settling and decanting with or without addition of flocculants. The solid residue obtained in step (d1) may be washed with water and can be further treated in order to separate the carbonaceous and polymeric components as described above, for example by a solid-solid-separation method. In one embodiment of the present invention step (c) and step (d1) are performed sequentially in a continuous operation mode.

In step (d), the pH value (e.g. of the above slurry or solution, which can be obtained in step (c)) is adjusted to 2.5 to 8, preferably 5.5 to 7.5 and even more preferably from 6 to 7. The pH value may be determined by conventional means, for example potentiometrically, and refers to the pH value of the continuous liquid phase at 20° C.

The adjustment of the pH value is done by dilution with water or by addition of bases or by a combination thereof. Examples of suitable bases are ammonia and alkali metal hydroxides, for example LiOH, NaOH or KOH, in solid form, for example as pellets, or preferably as aqueous solutions. Combinations of at least two of the foregoing are feasible as well, for example combinations of ammonia and aqueous caustic soda. Step (d) is preferably performed by the addition of at least one of sodium hydroxide, lithium hydroxide, ammonia and potassium hydroxide.

Step (e)

The step (e) is removing compounds of Al, Fe, Zn and Cu from the solution or slurry obtained in step (d). The compounds of Al, Fe, Zn and Cu are preferably carbonates, oxides, phosphates, hydroxides or oxyhydroxides. Usually, at least one, preferably combinations of at least two of the compounds of Al, Fe, Zn and Cu are removed. Preferably, step (e) comprises the removal of precipitates (e.g. by solid-liquid separation) of carbonates, oxides, phosphates, hydroxides or oxyhydroxides of Al, Fe, Zn and Cu, or combinations of at least two of the foregoing. Said precipitates may form during adjustment of the pH value. Phosphates may be stoichiometric or basic phosphates. Without wishing to be bound by any theory, phosphates may be generated on the occasion of phosphate formation through hydrolysis of hexafluorophosphate or its decomposition products formed during step (a). It is possible to remove said precipitates by filtration or with the help of a centrifuge or by sedimentation. Preferred filters are belt filters, filter press, suction filters, and cross-flow filter. Filtering aids and/or flocculants may be added to improve the solid-liquid separation.

In a preferred embodiment of the present invention step (e) includes an optional step (e1). Step (e1) includes a treatment of a solution obtained after step (d) or step (e) with metallic nickel, metallic cobalt or metallic manganese or any combination of at least two of the foregoing (for example as physical mixture or as alloys). Said metallic nickel, cobalt, or manganese may be in the form of sheets, plates, lumps, granules, turnings, wires, briquettes, electrode fragments, powders or foams. In the context of the present invention, sheets may have a thickness in the range of from 0.1 to 5 mm and a length and width that are identical or different and each in the range of from 1 cm to 10 meters. Plates can, for example, have a thickness in the range of from 5.5 mm and a length and width that are identical or different and each in the range of from 2 cm to 10 meters. Turnings may have, for example, a thickness in the range of from 0.1 to 1 mm, a width in the range of from 1 to 5 mm and a length in the range from 1 cm to 20 cm. Briquettes may have a length in the range from 2 to 3 cm and a diameter in the range of from 12 to 15 mm. Electrode fragments can, for example, have a thickness in the range of from 0.5 to 7.0 mm. In many cases, uncut electrode fragments have a thickness in the range of from 1 to 3 mm and irregular cross sections, with the diameter at the broadest place not exceeding 40 mm and the average diameter being in the range of from 10 to 30 mm. Cut electrodes may have a thickness in the range of from 0.5 to 7.0 mm and a cross-section of from 0.1 to 1,000 $cm^2$. For example, it is possible to obtain cut electrodes, especially from cobalt, having a thickness of 1 mm and a cross section of 10 cm·10 cm or a thickness in the range of from 5 to 7 mm and a cross section of 55 mm·55 mm. Powders and foams may be used as well and include specially activated materials such as Raney-nickel and Raney-cobalt, for example with an average particle diameter in the range of from 500 nm to 1000 µm and a BET surface in the range of from 0.0001 to 50 $m^2/g$, determined by $N_2$ adsorption according to DIN 66131.

Lumps, granules and powders of manganese, cobalt or nickel are preferred. For the purpose of the present invention, lumps have a length, width and height in the range of from 5 mm to 10 cm, with the smallest dimension and the largest dimension differing by a factor greater than 1 but not more than 3. Granules have an average length, width and height in the range of from 2 mm to 1 cm. Powders consist of particles of an average diameter of at most 1 mm, preferably in the range of 1 to 200 µm.

In one embodiment of the present invention, step (e1) is performed at a temperature in the range of from 10 to 90° C., preferably from 25 to 60° C.

In optional step (e1), a solution obtained after step (e) is contacted with metallic nickel, cobalt or manganese or a combination of at least two of the foregoing, for example in a column. In such embodiments, it is advantageous to provide a column packed with metallic nickel, metallic cobalt or metallic manganese or a combination of at least two of the foregoing in the form of lumps or granules, for example as fixed bed, and allowing a stream of the solution to flow through such column.

In one embodiment of the present invention, step (e1) is performed at normal pressure. In one embodiment of the present invention, step (e1) has a duration in the range of from 10 min to 5 hour, or 30 minutes to 5 hours. In case step (e1) is performed in a column, the duration corresponds to the average residence time. In one embodiment of the present invention, step (e1) is performed at a pH value range from 1 to 6, preferably pH 2 to 5. The lower the pH value in step (e1) the higher is the amount of metal selected from Ni, Co and Mn to be dissolved under hydrogen formation.

In one form copper contained in the solution obtained from step (d), (e) or (e1) is recovered by depositing copper as elemental metal on a deposition cathode by electrolysis of an electrolyte containing said solution. The electrolysis can be run potentiostatic or galvanostatic, wherein potentiostatic is preferred. The electrochemical potential applied to the deposition cathode is usually kept in a range of −50 mV to −500 mV, preferably −100 mV to −400 mV, and in particular −150 mV to −300 mV with respect to the electrochemical potential of copper ($Cu^{2+}+2\ e^-\rightarrow Cu^0$) in the electrolyte. The electrolyte is usually an aqueous electrolyte. The electrolyte may have a pH above 1, 2, 3, 4, or 5, preferably above 5. The electrolyte may have a pH below 10, 9, or 8. In another form the electrolyte may have a pH from 4 to 8. The electrolyte may contain buffer salts, e.g. salts of acetate, to adjust the pH value. The deposition cathode may consist of sheets of conducting materials like metals or glassy carbon. Preferred are materials that provide a high over-voltage for the formation of hydrogen which should be avoided. A suitable metal is lead. The cathode can also be made from conducting particulate matter e.g. metal or graphite particles. These particles have a particle size d50 in the range from 1 to 1000 µm, preferably from 5 to 500 µm, and in particular from 5 to 200 µm. The deposition cathode can be obtained at least partially from the transition metal oxide material. In particular the electrolysis is made in an electrochemical filter flow cell in which the electrolyte is passed through a deposition cathode in form of a particulate filter-aid layer. The electro-chemical filter flow cell comprises usually a flow cell anode, which can be made of anode materials as given above. The flow cell anode and the deposition cathode may be separated by a diaphragm or a cation exchange membrane as mentioned above. The deposited metals be separated, re-dissolved and precipitated as e.g. hydroxides.

The mixture obtained after step (e1) may be treated by a solid-liquid separation operation preferably a filtration in order to ensure that no metallic particles or other unwanted solids are transferred to the following steps. The step (e1) may be repeated one or more times in order to further improve the efficiency of this step.

Step (e1) is particularly useful for removal of copper traces. By performing step (e1), no new impurities that would require an additional purification step are introduced into the solution of transition metals. Even if said metallic nickel, cobalt or manganese contains traces of copper they do not dissolve.

Further purification steps may be added. Such further purification steps may comprise other precipitation reactions, e.g., with sulfides at controlled pH-values or with certain other anions that are able to form insoluble precipitates with impurity elements, e.g., oxalates, tartrates, phosphates, or silicates. Further options are to selectively separate off such impurities by the application of solvent extraction for example employing selective extractants in a hydrocarbon solvent immiscible with the aqueous metal salt solution. Such extractants may be based on di- or tri-alkyl esters of phosphoric acid, like di(2-ethyl-hexyl)phosphoric acid and tri-n-butyl phosphate, or they are based on hydroxyoximes, for example 2-hydroxy-4-n-octyloxybenzophenone oxime.

In one form nickel and cobalt if applicable contained in the solution obtained from step (e) or (e1) is recovered by hydrogen injection in the solution at a temperature above 100° C. and a partial pressure above 5 bar to precipitate metal, such as nickel and/or cobalt, and optionally followed by separation of the obtained precipitate. This separation can be a filtration, a centrifugation or a sedimentation. As nickel and cobalt are magnetic metals these precipitates may also be recovered by a magnetic separation. The hydrogen gas is injected at the temperature of above 100° C., preferably above 130° C., and in particular above 150° C. In a preferred form the hydrogen gas is injected at a temperature of 150 to 280° C. The hydrogen gas is injected at a partial pressure of above 5 bar, preferably above 10 bar, and in particular above 15 bar. In a preferred form the hydrogen gas is injected at a partial pressure of 5 to 60 bar.

The pH of the solution can be adjusted before or during the injection of the hydrogen gas. As the reduction produces acid a continuous neutralization of the acid is preferred to keep the acid concentration low. Generally, the hydrogen gas is injected in the leach at a pH-value above 4, preferably above 6, and in particular above 8. The pH-value can be adjusted by continuously feeding of bases while controlling the pH-value. Suitable bases are ammonia. In a preferred form the hydrogen reduction is done in the presence of a suitable buffer system. Examples of such a buffer system are ammonia and ammonium salts like ammonium carbonate, ammonium sulfate or ammonium chloride. When using such buffer systems, the ratio of ammonia to nickel or to nickel and cobalt should be in the range of 1:1 to 6:1, preferably 2:1 to 4:1.

A nickel-reduction catalyst and/or a cobalt-reduction catalyst may be present in the solution during the injection of the hydrogen gas, such as metallic nickel, metallic cobalt, ferrous sulfate, ferrous sulfate modified with aluminum sulfate, palladium chloride, chromous sulfate, ammonium carbonate, manganese salts, platinic chloride, ruthenium chloride, potassium/ammonium tetrachloroplatinate, ammonium/sodium/potassium hexachloroplatinat, or silver salts (e.g. nitrate, oxide, hydroxide, nitrites, chloride, bromide, iodide, carbonate, phosphate, azide, borate, sulfonates, or carboxylates or silver). Ferrous sulfate, aluminum sulfate and manganese sulfate may be present in the leach from corresponding components of the transition metal material. Preferred nickel-reduction catalysts and/or a cobalt-reduction catalyst are ferrous sulfate, aluminum sulfate, manganese sulfate and ammonium carbonate. A preferred nickel-reduction catalyst is metallic nickel, in particular metallic nickel powder. A preferred cobalt-reduction catalyst is metallic cobalt powder. These metal powders of nickel or cobalt may be obtained in-situ at the beginning of the reduction process or ex-situ in a separate reactor by reducing aqueous Ni and Co salt solutions.

In a preferred form the solution contains dissolved salts of nickel, and nickel in elemental form is precipitated by the hydrogen injection, optionally in the presence of a nickel-reduction catalyst. In a form the leach contains dissolved salts of cobalt and cobalt in elemental form is precipitated by the hydrogen injection, optionally in the presence of a cobalt-reduction catalyst. In another preferred form the leach contains dissolved salts of nickel and of cobalt, and nickel and cobalt in elemental form is precipitated by the hydrogen injection, optionally in the presence of a nickel-reduction catalyst and a cobalt-reduction catalyst. In another preferred form the leach contains dissolved salts of nickel and of cobalt, and nickel in elemental form is precipitated by the hydrogen injection, optionally in the presence of a nickel-reduction catalyst, and where the precipitate may contain 0 to 50 wt % of cobalt in elemental form.

Step (f)

The optional step (f) includes the precipitation of the transition metals as mixed hydroxides or mixed carbonates, preferably as mixed hydroxides. In cases where nickel and cobalt have been recovered by one of the methods described above (e.g. by hydrogen injection or electrolysis) step (f) serves to precipitate manganese and residual nickel and cobalt if applicable.

In a preferred embodiment of the present invention, step (f) is performed by adding ammonia or an organic amine such as dimethyl amine or diethyl amine, preferably ammonia, and at least one inorganic base such as lithium hydroxide, sodium hydroxide, potassium hydroxide, sodium carbonate, sodium bicarbonate, potassium carbonate or potassium bicarbonate or a combination of at least two of the foregoing. Preferred is the addition of ammonia and sodium hydroxide.

In one embodiment of the present invention, step (f) is performed at a temperature in the range of from 10 to 85° C., preferred are 20 to 50° C. In one embodiment of the present invention, the concentration of organic amine—or ammonia—is in the range of from 0.05 to 1 mole/l, preferably 0.1 to 0.7 mole/l. The term "ammonia concentration" in this context includes the concentration of ammonia and ammonium. Particular preference is given to amounts of ammonia for which the solubility of $Ni^{2+}$ and $Co^{2+}$ in the mother liquor is not more than 1000 ppm each, more preferably not more than 500 ppm each.

In one embodiment of the present invention, mixing is effected during step (f) of the inventive process, for example with a stirrer, a rotor stator mixer or a ball mill. Preference is given to introducing a stirrer output of at least 1 W/l into the reaction mixture, preferably at least 3 W/l and more preferably at least 5 W/l. In one embodiment of the present invention, a stirrer output of not more than 25 W/l can be introduced into the reaction mixture.

The optional step (f) of the inventive process may be performed in the presence or absence of one or more reducing agents. Examples of suitable reducing agents are hydrazine, primary alcohols such as, but not limited to methanol or ethanol, furthermore ascorbic acid, glucose and alkali metal sulfites. It is preferred to not use any reducing agent in step (f). The use of a reducing agent or inert atmosphere or both in combination is preferred in cases where major amounts of manganese are present in the transition metal oxide material, for example, at least 3 mol-%, referring to the transition metal part of the respective cathode active material.

Step (f) of the inventive process may be performed under an atmosphere of an inert gas like e.g. nitrogen or argon or carbon dioxide.

In one embodiment of the present invention, step (f) is performed at a pH value in the range of from 9 to 14 preferred are pH values from 11 to 12.5 in the case of hydroxides and pH values in the range from 7.5 to 8.5 in the case of carbonates. The pH value refers to the pH value in the mother liquor, determined at 23° C.

Step (f) may be carried out in a batch reactor or—preferably—continuously, for example in a continuous stirred tank reactor or in a cascade of two or more, for example two or three continuous stirred tank reactors.

Step (f) of the inventive process may be performed under air, under inert gas atmosphere, for example under noble gas or nitrogen atmosphere, or under reducing atmosphere. An example of a reducing gas is, for example, $SO_2$. Preference is given to working under inert gas atmosphere, especially under nitrogen gas.

For the purpose of further purification, the solids recovered in step (f) may be dissolved in an acid, for example hydrochloric acid or more preferably sulfuric acid, and re-precipitated.

The inventive process can be set-up in part or in whole as a continuous process controlled by sensors and actuators as part of a computer based process control system.

Further alkali metals may be recovered from any of the mother liquors of the inventive process, for example sodium, by selective crystallization techniques.

By performing the inventive process, it is possible to recover the transition metals nickel and, if applicable, manganese and cobalt from spent batteries containing nickel and—if applicable, also manganese and cobalt—in a form that they can be converted into cathode active materials very easily. In particular, the inventive process allows the recovery of transition metals such as nickel and cobalt and, optionally, manganese, that contain only tolerable traces of impurities such as copper, iron, and zinc, for example with less than 10 ppm of copper, preferably even less, for example 1 to 5 ppm.

The invention is further illustrated by a working example.

EXAMPLES

The metal impurities and phosphorous were determined by elemental analysis using ICP-OES (inductively coupled plasma—optical emission spectroscopy) or ICP-MS (inductively coupled plasma—mass spectrometry). Total carbon was determined with a thermal conductivity detector (CMD) after combustion. Fluorine was detected with an ion sensitive electrode (ISE) after combustion for total fluorine or after $H_3PO_4$ distillation for ionic fluoride. Phase compositions of solids were determined with powder x-ray diffractometry (PXRD).

Step (a) Heating

An amount of 192.7 g simulated spent battery scrap containing

- 78.8 g cathode active material containing nickel, cobalt and manganese in similar molar amounts, approximate formula $Li(Ni_{0.34}Co_{0.33}Mn_{0.33})O_2$,
- 62.2 g of organic carbon in the form of graphite and soot
- 47.0 g of organic electrolyte mixture (containing $LiPF_6$)
- 7.4 g polyvinylidene fluoride as binder,
- 2.4 g aluminum powder,
- 0.2 g iron powder,
- 2.0 g copper metal was placed into a 500-mL quartz round bottom flask and attached to a rotary evaporator in a way that the flask was immersed in an oven. Within 4.5 hours the rotating flask was heated to 800° C. under a flow of argon (20 l/h) and held at this temperature for 1 hour. An amount of 173.3 g heat treat material were obtained. 102.7 g of this powder were again heated to 800° C. under a flow of Argon (20 l/h) to 350° C. and above 350° C. under a flow of air (20 l/h) and held at 800° C. under air for 1 hour. From this 99.0 g heat treated material were obtained comprising a phase composition of Ni/Co-alloy, iron manganese oxide, $Li_2CO_3$, LiF, and graphite.

Step (b): Treating with Water/$CO_2$ 30.0 g of the material obtained after the treatment under air described in Step (a) was slurried into 100 mL deionized water and subjected to a $CO_2$ atmosphere of 50 bar $CO_2$ in a stirred pressure autoclave. The suspension was stirred for three hours at ambient temperature. After releasing the pressure, the slurry was recovered from the autoclave and filtered. 100 g of a clear non-diluted $LiHCO_3$ solution were recovered as filtrate. The lithium content in the filtrate was determined to 0.85 wt % corresponding to a leaching efficiency of 61% referred to the full amount of water employed for extraction. The filter cake was washed with 350 g water and dried in an oven. PXRD of the remaining solid indicated no residual traces of $Li_2CO_3$.

17.7 g of the recovered non-diluted filtrate were heated to 95° C. and filtered hot. An amount of 0.37 g of pure $Li_2CO_3$ was recovered as solids, corresponding to a recovery rate of 46% of the Li, calculated as $Li_2CO_3$.

Step (c): Treatment with Acid 19.96 g of heat treated powder from step (b) were added to 201 g $H_2SO_4$ (96% $H_2SO_4$) in a 4 necked 1 L round bottom flask. The resultant slurry was stirred at 60° C. for 4 hours and then slowly added to 103 g ice placed in a 500 ml beaker while keeping the temperature below 50° C. Another 208 g ice-water were used to wash the residual slurry from the flask into the beaker. The resulting mixture was filtered with a glass frit and the solid residue was washed with 301 g water. 844 g of a clear and red colored filtrate were obtained, containing 2.19 g Ni, 2.19 g Co, 2.16 g Mn, less than 1 ppm Cu, 0.12 g Fe, and 0.13 g Al. This corresponds to leaching efficiencies >97% for Ni, Co, and Mn, as well as a separation efficiency for Cu of 100%.

Step (d): Adjusting the pH

The pH value of 200 g of the filtrates from step (c.1) was adjusted to a pH value of 6.5 by gradually adding 315 g of a 4 molar caustic soda solution under stirring, followed by 2.7 g of 1 molar caustic soda solution.

Step (e): Removing Compounds

Precipitate formation could be observed. After stirring for 12 hours, the solids were removed by suction filtration. The filtrate (515 g) so obtained contained impurity levels of Al and Fe below 15 ppm and of Cu <1 ppm.

It was excellently suited for high-yield recovery of Ni, Co and Mn at very low impurity level.

The invention claimed is:

1. A process for the recovery of transition metal from spent lithium ion batteries containing nickel, wherein said process comprises the steps of
    (a) heating a lithium containing transition metal oxide material to a temperature in the range of from 600 to 1200° C.,
    (b) treating said heat-treated material with water and obtaining a solid residue,
    (c) treating the solid residue obtained in step (b) with an acid selected from the group consisting of sulfuric acid, hydrochloric acid, nitric acid, methanesulfonic acid, oxalic acid and citric acid to obtain a solution or slurry,
    (d) adjusting the pH value of the solution or slurry comprising the solid residue treated in step (c) to 2.5 to 8,
    (e) removing compounds of Al, Cu, Fe, Zn or combinations of at least two of the foregoing from the solution or slurry obtained in step (d);
    (f) precipitating nickel and, if applicable, cobalt and/or manganese as (mixed) hydroxide, oxyhydroxide or carbonate by raising the pH value above 8.

2. The process according to claim 1 wherein step (e) comprises the removal of precipitates of carbonates, oxides, phosphates, hydroxides or oxyhydroxides of Al, Cu, Fe, Zn, or combinations of at least two of the foregoing.

3. The process according to claim 1 wherein the lithium containing transition metal oxide material is present in form of complete batteries, battery modules, battery cells, or battery scraps.

4. The process according to claim 1 wherein step (b) is performed under $CO_2$ at a pressure in the range of from 10 to 150 bar.

5. The process according to claim 1 wherein step (b) is performed at a temperature in the range of from 5 to 100° C.

6. The process according to claim 1 wherein step (b) has a duration in the range of from 20 minutes to 10 hours.

7. The process according to claim 1 wherein step (a) is performed under inert atmosphere, under an atmosphere that contains oxygen, or the atmosphere is changed during step (a) from inert to oxygen containing atmosphere.

8. The process according to claim 1 wherein prior to step (c) a solid-solid separation step is performed to separate non-soluble components like carbon and polymers from the metallic or metal oxide components.

9. The process according to claim 8 wherein said solid-solid separation step is a magnetic separation step.

10. The process according to claim 1 wherein step (d) is performed by the addition of at least one of lithium hydroxide, sodium hydroxide, ammonia and potassium hydroxide.

11. The process according to claim 1 including recovering the lithium by way of precipitation as carbonate.

* * * * *